Nov. 30, 1971 — R. H. KELLER — 3,623,856
MOLD SPRAY APPARATUS
Filed Feb. 2, 1970 — 2 Sheets-Sheet 1

INVENTOR
ROBERT H. KELLER
ATTORNEYS

United States Patent Office 3,623,856
Patented Nov. 30, 1971

1

3,623,856
MOLD SPRAY APPARATUS
Robert H. Keller, Toledo, Ohio, assignor to
Owens-Illinois, Inc.
Filed Feb. 2, 1970, Ser. No. 7,535
Int. Cl. C03b 39/00
U.S. Cl. 65—169                                                 8 Claims

ABSTRACT OF THE DISCLOSURE

Automatic lubrication spray of glass forming molds is accompanlished by mounting a spray mechanism on one side of the mold, positioned so as to give clearance into the mold cavity for the charge of glass and the seating of baffles. The spray mechanism is controlled as to the quantity of spray which is sprayed into the molds by a selection of the precise spray nozzle. The application of the spray is carried out through the use of a pivoted arm which is motor driven to position the arm such that the spray nozzle carried by the arm is positioned above the mold in co-axial alignment with the vertical axis of the mold cavity at the time the lubricant is sprayed. The motor functions to move the arm into spray position and then to retract the arm out of the way to permit the other forming operations to be carried with respect to the glass which is introduced into the mold, normally at a time slightly after the spray has occurred.

BACKGROUND OF THE INVENTION

In the lubrication of glass forming molds, particularly parison molds, it is common practice for the operator periodically to "swab" the mold with a brush after dipping the longhandled brush into a jar or can of lubricant. The lubricants frequently are an oil base material with powdered graphite suspended in the oil. The frequency of application of this lubricant by the machine operator has become somewhat of an art, with some operators believing that swabbing should be carried out more frequently than do others. Some believe that once every ten minutes is necessary, while others wait until the physical appearance of the glass as it is removed from the mold indicates to them that swabbing is necessary. As the glass begins to stick to the mold or gives the appearance of having stuck, the operators usually commence swabbing. The amount of lubricant which is swabbed into the molds is pretty much discretionary and obviously will vary from operator to operator, depending upon his own personal views as to how swabbing should be done.

As would be expected, the hand swabbing of molds becomes one factor in the glass forming process which is without any consistent control between shifts in the same plant on the same machines, as well as between operators in different plants. Excessive swabbing can, in many instances, result in leaving small black specks sticking to the side of the parison, in particular, the neck mold area of the parison. These obviously are objectionable from an appearance standpoint and may result in producing a defectively sealed container.

DESCRIPTION OF PRIOR ART

Attempts have been made in the past to provide automatic spray equipment for glass forming molds; however, these have been relatively unsuccessful, primarily because of their lack of precision and the inability to control the amount of spray. Mounting of spray heads in the past has been connected with stationary mechanisms rather than being mounted on the mold and has required the forming cycle to be slowed down to permit the spray time required. Spraying has also been accomplished by providing a spray arrangement connected or associated with the glass delivery funnel mechanism, for example, as shown in applicant's prior U.S. Pat. 3,141,752. While this system has met with some success, problems have been encountered because of the difficulty of keeping the equipment functioning and with the fact that the spray pattern which may be produced is not as desirable as a divergent spray pattern which is directed from the axis of the mold cavity.

SUMMARY OF THE INVENTION

This invention relates to apparatus for spraying mold lubricant into open-top glass forming molds, wherein a casting is mounted on the mold supporting structure at one side of the mold, with the casting pivotally supporting an arm having a spray nozzle at its outer end with motor means connected to the arm to swing the arm into and out of overlying relationship with respect to the open top of the glass forming mold, with means for feeding lubricant and air under pressure through a passage in the arm to a nozzle positioned at the outer end of the arm. The mechanism accurately positions the nozzle over the central axis of the mold cavity.

BRIEF DESCRIPTION OF THE DRAWINGS

With particular reference to the drawings, and in particular FIG. 1, the spray apparatus of the invention is illustrated as being mounted on one-half of a mold supporting mechanism. Molds 10, specifically illustrated here as one-piece molds, are supported by split mold holders 11 and 12 which are commonly, pivotally connected to a pivot post 13, with the holder 12 being formed with a mounting plate portion 14 which is bolted to mold supporting arm 15. The arm 15 is supported by a vertical post or sleeve 16 which, in the particular arrangement of solid blank molds, as specifically illustrated, serves as an actuated mechanism for raising and lowering the molds 10 relative to neck molds and pressing plungers (not shown), for example, as shown in U.S. Pat. 3,024,571, wherein FIG. 6 shows a dual parison mold holder 31 supported by a hollow sleeve portion 35.

Figure 1:
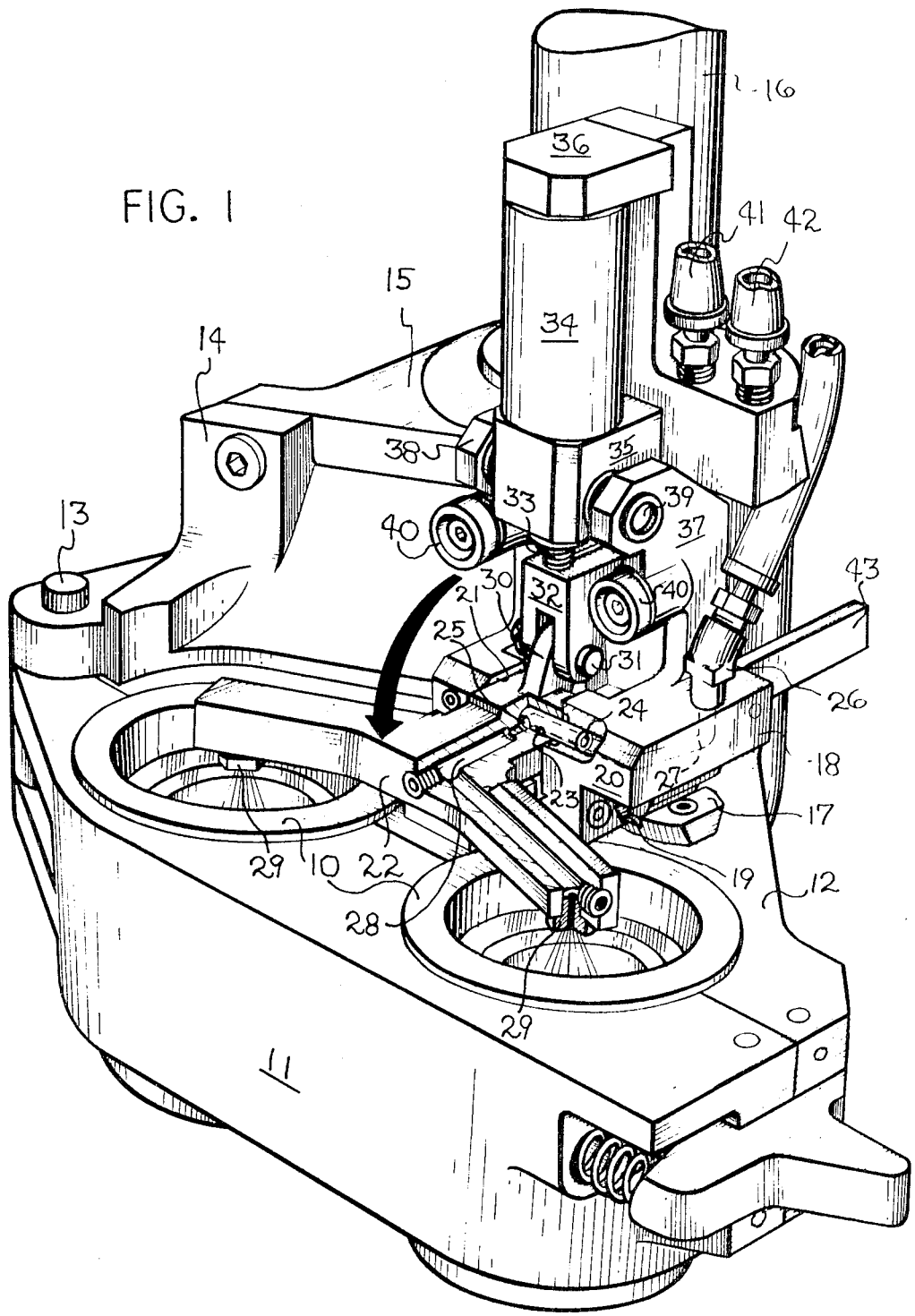
FIG. 1 is a perspective view of the mold spray equipment of the invention, mounted on a parison mold.

The mold holder 12, on its upper surface, supports a dove-tail block 17 attached thereto. A casting 18, provided with a dove-tail slot 19 in its bottom surface, cooperates with the block to positively locate the casting 18 relative to the mold holder 12, thus providing a quick change arrangement for mounting the casting to the mold holder. The casting 18, toward its forward or mold facing surface 20, is formed with a slot 21. The slot 21 accommodates the base of a Y shaped arm 22 which has a horizontal, pin receiving, opening 23 formed therein. A horizontal pin 24 extends through the opening 23 in the arm and spans the slot 21 formed in the casting 18 and serves as the pivot pin for the arm 22. The pin 24 is drilled-out axially for a distance at least equal to one-half of its length and is provided with a side opening port 25.

The casting 18 has a threaded fitting 26 connected thereto which communicates, through a passage 27 formed in the casting 18, with the drilled opening in the interior of the pin 24, thus providing a means for supplying air and lubricant mixture to the port 25. The port 25 in turn, as illustrated in FIG. 1, communicates with a passageway 28 in the arm 22. The passageway 28 branches into two outlet passages in the arms of the Y shaped arm 22 which in turn terminates in a pair of spray nozzles 29.

It should be understood that the pin 24 is mounted within the casting 18 in such a manner that it does not rotate about its axis, but that the arm 22 will pivot about the pin 24.

The arm 22, at its base end, has an upwardly and rearwardly extending bell crank portion 30. The bell crank 30 is pivotally coupled to pin 31 of a clevis 32. The clevis 32 is connected to a piston rod 33 of a fluid motor 34. The fluid motor 34 is composed of a cylinder portion with its ends closed by a pair of end blocks 35 and 36.

The casting 18 is formed with a pair of upstanding, spaced-apart arms 37 and 38 which serve to pivotally support the lower end block 35 of the motor 34 positioned therebetween. Thus, the motor 34 may pivot slightly about the axis of stub shafts 39 which extend outwardly from the block 35 and into bearings provided in the arms 37 and 38 of the casting 18.

Figure 2:
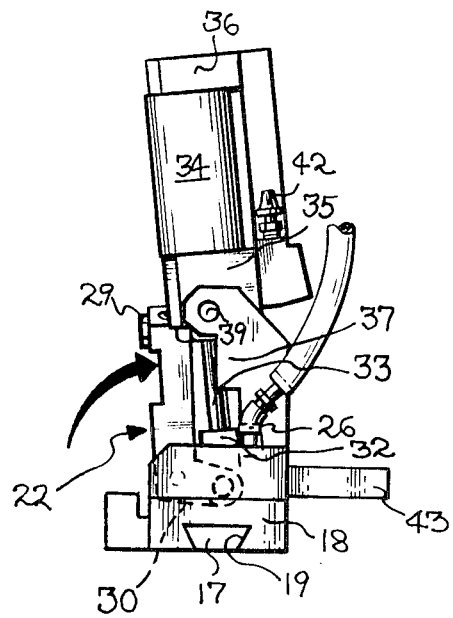
FIG. 2 is a schematic, side elevational view of spray apparatus of FIG. 1 showing the spray arm in retracted position.

The arms 37 and 38 also, at their forward ends, carry a pair of replaceable cushioning pads 40 which serve to prevent damage of the arm 22 upon retraction of the arm to the position shown in FIG. 2.

Figure 3:
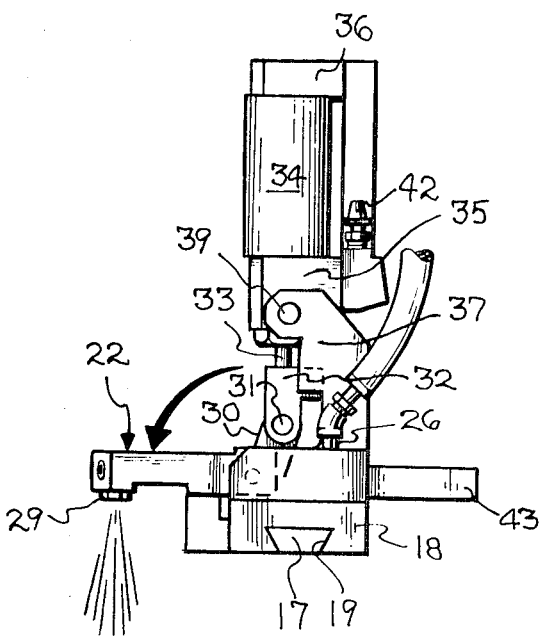
FIG. 3 is a schematic, side elevational view, similar to FIG. 2, illustrating the spray arm in extended spraying position.

Reciprocating motor 34 is actuated by the alternate application of fluid under pressure and the exhausting of such fluid through lines 41 and 42, it being understood that line 41 connects with the upper end of the motor 34 and line 42 connects with the lower end of the motor 34. Thus it can be seen, particularly when viewing FIGS. 2 and 3, that upon actuation in one direction, the motor 34 retracts the piston rod 33. The arm 22 is pivoted through approximately 90° to a position where it overlies the parison molds 10, with the nozzles 29 thereof being co-axially aligned with the central, vertical axis of the parison molds 10. Reverse operation of the motor 34 will retract the arm 22 from the position shown in FIGS. 1 and 3 to the rest or retracted position of FIG. 2. Inasmuch as the bell crank 30 must move through an arc of approximately 90°, the motor 34, with its piston rod 33, is so mounted that the motor will rotate slightly relative to the casting 18, as can be seen when viewing FIGS. 2 and 3, to prevent binding of the piston rod.

As previously explained, the spray mechanism, as described in detail, is mounted to the mold holder 12 by a quick change arrangement and, for convenience, is provided with a handle 43 extending rearwardly from the casting 18, thus providing easy portability of the mechanism and the ability to change the total spray mechanism in the event molds of different center distances are used in place of the molds previously used. In this case, rather than having to tear down the spray equipment and put in a new arm, an entire spray head mechanism may be replaced on the mold holder 12, which mechanism will have an arm of a different specific configuration so as to assure proper spray alignment with respect to the axes of the molds.

It should be readily understood that in the operation of the mechanism of the invention, the spray is introduced to the interior of the mold 10 at a point in time just prior to the feeding of a gob of molten glass into the mold. Obviously, at the time the gob charge is fed to the mold, it is necessary that the arm 22 be out of the way, and during subsequent forming operations with respect to the charge of glass, the arm 22 will remain in its retracted or rest position, as shown in FIG. 2, until a point in time just prior to introduction of the next gob of glass to the mold.

I claim:
1. Apparatus for spraying mold lubricant into open-topped glass forming molds cmprising, a casting having a passage with an opening formed therein, said casting being mounted on the mold holder at one side of said mold, an arm having a passageway extending therethrough, a spray nozzle communicating with said passageway and mounted on one end of said arm, the opening in said passage communicating with the passageway in said arm when said arm is in position with its spray nozzle centrally positioned over the opening in the mold, means pivotally mounting the end of said arm opposite said nozzle on said casting for vertical, pivoting motion of said arm about a horizontal axis at one side of said mold, motor means connected to said arm for moving said arm into position over said mold, and means for feeding lubricant and air under pressure to the passage in said casting.

2. The apparatus of claim 1, wherein said casting is formed with a dove-tail slot in its lower surface and further including a dove-tail block fixed the to mold holder whereby the casting is mounted to the mold holder to provide a quick change arrangement.

3. The apparatus of claim 1, wherein said motor means is a vertically positioned fluid motor, bell crank lever means connected to said arm and means connecting said motor to said bell crank lever.

4. The apparatus of claim 3, further including pivot means mounting said motor to said casting.

5. The apparatus of claim 4, wherein said pivot means comprises a pair of horizontal pivot shafts at a right angle to the direction of movement of said arm, and fixed to the lower end of said motor.

6. The apparatus of claim 1, wherein said casting is formed with a slot in its forward edge, and said means pivotally mounting said arm comprises a pivot pin extending across the slot in said casting and extending through an opening in end of said arm.

7. The apparatus therein of claim 6, wherein said pivot pin has an axially extending opening therein and a side opening adjacent the mid-point of its length, wherein said side opening connects the passage in the arm with the passageway in said casting.

8. The apparatus of claim 6, wherein said arm is in the form of a Y with the base of the Y pivotally supported by said pivot pin, nozzle means carried by both the extending ends of said arm and said passage in said arm extends from the base thereof into both branches of the Y to the nozzles carried thereby.

References Cited
UNITED STATES PATENTS

| | | | |
|---|---|---|---|
| 1,756,493 | 4/1930 | Peiler | 65—26 |
| 3,141,752 | 7/1964 | Keller | 65—169 X |
| 3,480,422 | 11/1969 | Lichok et al. | 65—24 X |

FRANK W. MIGA, Primary Examiner

U.S. Cl. X.R.

65—24, 26, 170, 262